Aug. 1, 1961

A. S. FITZ GERALD 2,994,816

ELECTRIC REGULATING SYSTEM

Filed Dec. 9, 1958

INVENTOR.

Alan S. Fitzgerald

United States Patent Office 2,994,816
Patented Aug. 1, 1961

2,994,816
ELECTRIC REGULATING SYSTEM
Alan S. Fitz Gerald, 333 Corte Madera Ave.,
Mill Valley, Calif.
Filed Dec. 9, 1958, Ser. No. 779,226
3 Claims. (Cl. 323—66)

This invention relates to automatic voltage and current regulating systems, and particularly to arrangements for controlling the output of rectifiers by means of saturable reactors or magnetic amplifiers.

It pertains especially to the circuit arrangements relating to what is referred in the art as the reference voltage.

It is well known in the art that the zero-balance or null principle, of which the Wheatstone bridge is a notable example, represents the most accurate and effective method of measurement and control.

Power control devices of the general class to which my present invention appertains have in the past tended towards the employment of the principle of comparison of the magnitudes of currents or M.M.F.s aplied in opposing sense to a magnetic core.

While such arrangements are, to be sure, properly to be described as null systems, the null point may be said to be an intangible one in the sense that it is an algebraic resultant which cannot readily be manifested as a zero indication on a simple type of measuring instrument.

According to my present invention I employ, for the purpose of deriving the required controlling effect, or sensing signal, the direct comparison of opposing E.M.F.'s, utilizing the basic principle exemplified by the measurement device well known in the art as the potentiometer, in which the balance point is demonstrable as a condition in which there is zero flow of current in the indicating or sensing circuit. I find that the use of this very well known principle in rectifier regulating systems presents advantages not possible with the current balance method.

In regulating systems of the type referred to there are two principal conventional methods of providing what is known as the reference; that is to say the element in the regulating system the function of which is to establish the exact level of voltage, or other variable to be regulated, which is to be maintained. Deviations from this norm are detected by the sensing circuitry in the form of an error signal variable both in sense and magnitude applied to the controlling apparatus so as to restore the condition to the required level.

The first of these two principles employs non-linear elements in such a manner as to establish a null point at the voltage at which it is desired that the output be maintained, and which furnishes an error signal reversing its polarity or sense with deviations above or below the correct voltage magnitude.

Various elements are well known and used for this purpose, such as thermal resistance phenomena, and other non-linear conducting elements of which the most satisfactory are known in the art as Zener diodes. A number of these devices possess excellent characteristics for the desired purpose as regards accuracy and stability. However, particularly in regulating systems for controlling large amounts of power in the range of a substantial number of kilowatts, in order to secure a satisfactory dynamic control characteristic an important factor which must be considered in the selection of the reference element to be employed relates to the amount of sensing, signal, or control power resulting from a deviation of any given percentage, from the norm, which is developed by the reference system and is made available to the control system to bring about the required corrective response.

It is in this respect that the non-linear type of reference devices available at the present time are less effective than is to be desired. While these low magnitude effects are of course susceptible of being stepped up to higher levels by additional amplifying apparatus, it is very desirable that the reference element may, to the maximum extent, be regarded as a primary standard in the regulating system. It is therefore necessary to take special care to exclude from any such additional amplifying structure any sources of instability liable to give rise to variation in gain.

A second type of reference, even more widely known than the foregoing class of devices, comprises an actual standard of the electrical quantity as, for example, voltage, which it is desired to be regulated. The classic example of this principle is of course the well known standard cell which forms the basic standard of accuracy in all electrical measuring instruments of the potentiometer type. In regulating systems which employ this type of reference, a sample of the output voltage, or a sub-multiple thereof, is directly compared with the reference voltage, as by connection in series with the latter in opposing sense. Clearly with this method of connection, when the output voltage is precisely correct there will be zero current flowing in the circuit. Error signal current will flow, in the forward or in the reverse sense, according to the direction of any deviation from the norm which may occur. For an example of the use of this form of reference system in a magnetic amplifier regulating system, U.S. Patent No. 2,459,069, issued to the present applicant may be cited.

It is to be noted that this reference principle is not subject to the practical limitations above referred to which apply, at the present time, in respect to available error signal power levels, to the Zener diode or other non-linear type reference elements, and I have found that with regulated rectifier equipment of substantial power output superior dynamic response characteristics are obtainable by the use of reference systems of the latter form designed to furnish substantially greater levels of error signal, sensing, or control power.

Other concomitant advantages of the direct comparison form of reference element will appear in the following description.

It is accordingly an object of my invention to provide a magnetic amplifier rectifier regulating system for substantial power output ratings having improved dynamic characteristics.

It is another object of my invention to provide a regulating system embodying a source of reference voltage in which no power is withdrawn from the reference source.

It is yet another object of my invention to provide an improved regulating system particularly adaptable to applications in which it is required that the apparatus be controlled in accordance with more than a single criterion or parameter.

It is a further object of my invention to provide a current limit control for regulated rectifying systems of improved effectiveness and precision.

These and other novel features which I believe to be characteristic of my invention will be set forth with particularity in the appended claims. My invention itself, however, both as to its organization and method of operation, together with further objects and advantages thereof, may best be understood with reference to the following description taken in connection with the accompanying drawings, in which:

Figure 1:
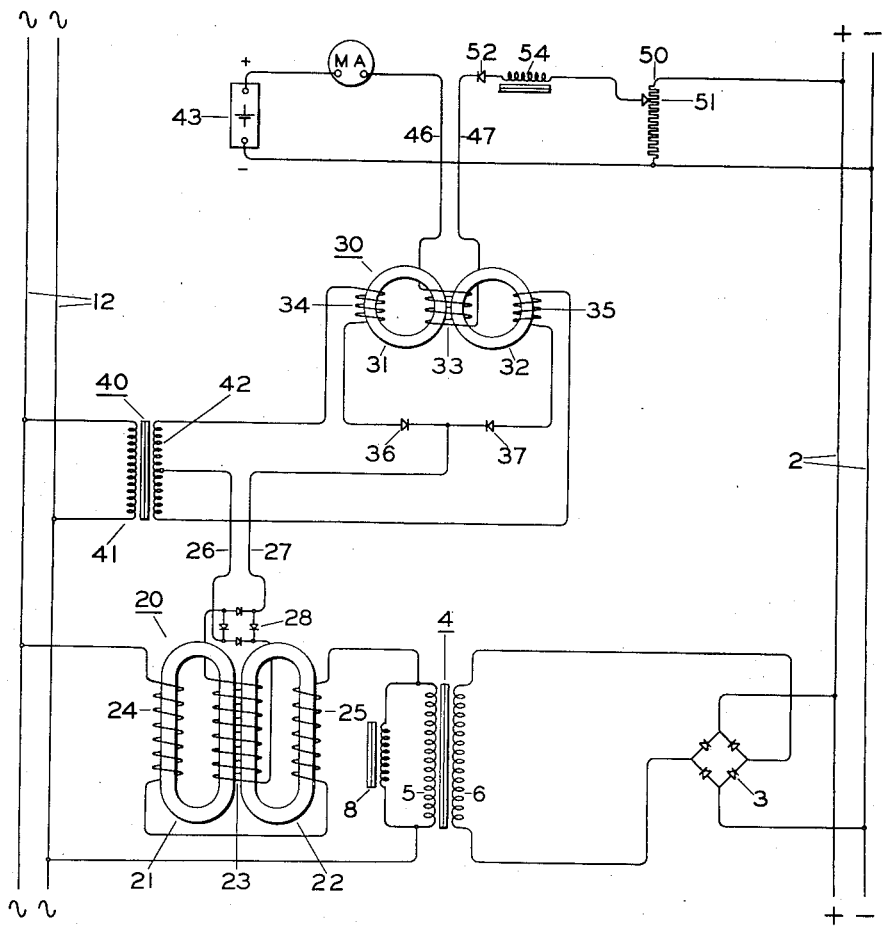
FIG. 1 is a schematic diagram illustrating an embodiment of my invention for regulating the output voltage of a rectifier.

Referring to the drawings I show in FIG. 1 a load or output circuit 2 supplied with direct current from a rectifier 3, which receives A.-C. power from a transformer 4, having a primary winding 5 and a secondary winding 6, to which latter the rectifier 3 is connected.

The transformer 4 is supplied from an A.-C. source 12 through a saturable reactor 20, which may suitably be constructed in the form of a pair of so-called C-cores 21 and 22, preferably consisting of grain oriented silicon steel, having a control winding 23 embracing both of the cores 21 and 22, and a pair of output windings 24 and 25 each wound separately on the two cores 21 and 22 as shown in the drawing. The two output windings 24 and 25 are connected in series between the A.-C. source 12 and the primary winding 5 of the transformer 4, and are connected together in opposite sense, so as to provide de-coupling from the control winding 23, in the manner conventional in the magnetic amplifier art.

In the automatic regulating system of the present invention the saturable reactor 20 comprises the second stage of a two-stage magnetic amplifier. In order to supply the control winding 23 with the necessary control excitation, I show in FIG. 1 a first stage magnetic amplifier 30, consisting of a pair of toroidal cores 31 and 32 together with a control winding 33 embracing both 31 and 32 and a pair of output windings 34 and 35 each wound separately on the two toroids 31 and 32. I show also a pair of diodes 36 and 37, both of the latter, together with the windings 34 and 35 being energized from a transformer 40, having a primary winding 41 connected to the A.-C. source 12, and a mid-tapped secondary winding 42. The connections shown between the transformer winding 42, the output windings 34 and 35, and the diodes 36 and 37, are conventional, in the art, for a magnetic amplifier of the self-saturating type delivering unidirectional output current, which latter, as may be seen in FIG. 1, is delivered to the control winding 23 of the second stage, that is to say, the saturable reactor 20, by means of the conductors 26 and 27.

In systems involving relatively large amounts of rectified output power, to which the present invention especially pertains, as for example equipment intended to deliver a substantial number of kilowatts, there will ordinarily be a considerable disparity between the physical dimensions, and the power levels, of the first and the second stages. Those skilled in the magnetic amplifier art are familiar with the fact that there may occur in such instances a flow of inter-stage current the source of which does not reside in the first stage, but which has its origin as a result of a number of different phenomena present in the second stage, as for example, even harmonics or imperfect matching of the cores 21 and 22. These currents are sometimes of negligible magnitude but on occasion they may reach values sufficient to vitiate the proper performance of the magnetic amplifier. According to the extent to which these currents are present a number of different expedients are known by means of which their effects may be eliminated. In some instances a simple shunt resistor, connected in parallel with the winding 23, and diverting an inappreciable amount of gainful inter-stage excitation will suffice. Thyrite resistors may sometimes be employed with advantage; in other cases what has been described as a "free-wheeling diode," connected in parallel with the winding 23 is entirely effective. I show in FIG. 1 one of the best known devices for this purpose, comprising a bridge connected network 28, of rectifying elements connected between the first stage 30 and the input or control winding 23 of the second stage 20. While the network 28 is physically identical with an ordinary full-wave rectifying bridge I have depicted it in FIG. 1 in a distinctive attitude to distinguish it from such other full-wave rectifiers in the system as are included therein for the purpose of converting A.-C. to D.-C. The function of the bridge 28 being that of constituting a blocking action, and quite different from the normal function it is so shown in the drawings to avoid confusion with rectifiers per se.

In order to provide the first stage magnetic amplifier 30 with control excitation of the character necessary to cause the required regulating function to be performed, I provide a reference voltage and a sample voltage, and arrange to excite the control winding 33 of the first stage in accordance with the difference between these voltages. Thus I show in FIG. 1, at 43, a source of D.-C. reference voltage of any suitable or desired type as for example an electro-chemical element of suitable design such as a device of the type described in U.S. Patent 2,422,045, or the like. I show at 50 a fixed resistor connected directly across the load or output circuit 2 and which embodies the sample voltage to be compared with the reference 43. The resistor 50 is provided with an adjustable contact at 51. As shown in FIG. 1, the negative extremities of 43 and 50 are connected together and to the negative of D.-C. output circuit 2. The positive of the reference 43, and the adjustable contact point 51 are connected through a pair of sensing conductors 46 and 47, to the input winding 33 of the first stage 30, so that 33 receives the difference between the E.M.F. of the reference 43 and the voltage drop across that portion of the resistor 50 which is included between the contact point 51 and the negative extremity of 50. The connections between the first stage input winding 33 and the sensing circuit comprising the reference 43 and the sample voltage derived from the connection at 51 are to be so determined that the output of 30 tends to increase when the sample voltage is less than the reference voltage; and to be decreased when the sample voltage exceeds that of the reference 43. As will be evident to those skilled in the art the connections and arrangements of the second stage are such as furnish direct control; there is no sense or polarity involved: when the output of 30 increases, the output of 20 together with that of the power rectifier 3 is likewise raised. Thus, when the voltage supplied to the load circuit 2 is below the value indicated by the relation between the reference voltage 43 and the sample voltage derived from the connection at 51 the output of the rectifier 3 is increased; and when the load voltage deviates in the opposite sense the output of 3 is decreased, so as automatically to maintain the voltage across the load circuit 2 as a desired value, which latter may be adjusted by means of the movable contact at 51.

With particular reference to the controlling action of the saturating reactor 20 upon the power supplied to the load circuit 2, it may be desirable to draw attention to the fact that such a device as 20 is essentially a variable impedance element; and the manner in which it performs its control function in the circuit shown in FIG. 1 is strictly as a voltage drop producing means. Accordingly, this control function may not be exercised in the absence of current flowing in the windings 24 and 25. Thus it is well known to those skilled in the art that such systems are not capable of regulating below a minimum value of rated output current, which value, in practice may be of an order of five to ten percent of full load. It is therefore customary, in control systems of this general type, to provide a small artificial load permanently connected across the output so that even though the external circuit connected to the bus-bars at 2 be disconnected the minimum current necessary to provide the required voltage drop across 24 and 25 is present at all times. It will be apparent that the resistor 50 may serve this purpose. However, in large installations the amount of power required to furnish the minimum load may be substantially more than that which it represented by the requirements of the sensing circuit. This small percentage of unused power may in such instances amount to an appreciable economic loss; and this extra increment has to be included in the rating of 3 and 4.

It is possible when desired to secure the necessary minimum load, for voltage drop producing purposes, in the form of an A.-C. load. It need not be connected across the output of the rectifier 3, thus adding to the rating of the latter. I therefore show, in FIG. 1, at 8, an inductance or choke coil connected across the primary winding 5 of the transformer 4 in order to illustrate how there may be provided a minimum current in the windings 24, 25, to provide the necessary voltage drop for control purposes. However, it will be understood by those skilled in the art that the choke coil 8 may not necessarily represent a separate physically entity. Means are well known to the designers of transformers for determining the amount of magnetizing current drawn by the primary winding of a transformer, and in this case the transformer 4 may readily be constructed so as to draw a magnetizing current somewhat more than would be usual for conventional use. The preponderant component of the magnetizing current being wattless this method is economically preferable to the dissipation of power in the resistor 50.

Figure 2:
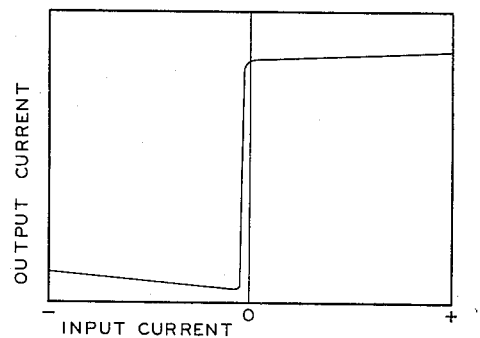
FIG. 2 is a curve to illustrate the manner of operation of my invention.

I show in FIG. 2 a curve illustrating the control characteristic of the type of self-saturating magnetic amplifier circuit comprising the first stage in FIG. 1 and shown therein at 30. In FIG. 2 the input current, that is say the current which flows in the winding 33, is shown as abscissa, and has both positive and negative values. The ordinate scale, in FIG. 2 shows the output current of the magnetic amplifier 30, having a value in one sense only. It will be noted, as pointed out above, that the second stage has no discrimination as to sense of input excitation. The positive direction, on the input scale, denotes the direction in which current flows when the reference voltage exceeds that of the sample.

Considering now the controlling action which the input current in 33 exerts upon the output of 30, it will be observed that broadly speaking positive values of input excitation are associated with the delivery of substantial output current from the magnetic amplifier; and that when negative input is applied the output is reduced to a relatively low value. A particular aspect of this characteristic to which it is desired to draw attention, is the point on the ordinate scale at which the curve crosses the abscissa zero axis. An essential element in my invention pertains to this feature. A second aspect of the characteristic curve of the magnetic amplifier which is of significance in the performance of the regulating system of FIG. 1, is the slope of the curve immediately to the left of the abscissa zero axis.

Both of these features depend, in the first place, upon the magnetic properties of the material of the toroids 31 and 32, and in the second place upon the quality of the performance of the diodes 36 and 37. For the efficient practicing of my invention I prefer to use materials which furnish a control characteristic resembling that shown in FIG. 2, such that, substantially full output is delivered at the point of zero input; and in which the slope of the curve in the neighborhood of the zero axis departs minimally from the vertical. I have found that a curve may be obtained when using core material such as is widely used in the art under the name of Deltamax, or the equivalent, and when there are employed diodes of superior quality preferably of the germanium or silicon type.

Various other materials give curves which intersect the zero axis at different values of output throughout the range of minimum to maximum output current; and furnish curves having different slopes. It is therefore pertinent to draw attention to the fact that it is well known in the art that the characterstic curve of any magnetic amplifier may be algebraically translated laterally to any desired extent by the addition of a bias winding carrying a substantially constant excitation; and that the slope of such a curve may be increased by the addition of an external series feedback winding. However, when materials of the type referred to are employed I have found no such additional windings to be necessary, and accordingly such windings are not illustrated in FIG. 1.

It is thus a feature of my invention that there be used for the first stage magnetic amplifier 30 a control characteristic such that substantially full output is delivered with zero input, this input being susceptible of being reduced to substantially zero with a low value of excitation of negative polarity.

With the type of sensing circuit which I have shown in FIG. 1, which operates on the direct voltage comparison principle like a potentiometer, in which a balance point giving a zero current value can exist, with a control characteristic such as that shown in FIG. 2, I am able to obtain certain advantages which are not possible with the above mentioned previously known regulating systems employing the current or ampere-turn balancing method.

In the first place, the sensing system may be designed so as to operate, throughout its normally designated range of automatic voltage control, with a sensing or control current, that is to say the current in the winding 33, which at all normal times has negative polarity. Accordingly under all normal operating conditions no current is withdrawn from the reference element 43. However, when the regulator is taken out of service or in the event of a power outage it would be possible for the element 43 to deliver current in the positive direction, since the opposing voltage across the resistor 50 will then be absent. However, provided that the control characteristic does not require the flow of positive current for normal functioning I may include in the sensing circuit, as shown at 52 an additional diode, preferably suitable for low current values, and having good rectifying properties; that is to say having low forward resistance and substantially zero leakage current. This will in no way interfere with the normal functioning of the regulating system. But in the absence of A.-C. power at 12 the diode 52 will preclude flow of positive current. Thus if it is desired to employ for the reference element 43 a suitable electro-chemical device or battery the latter will not at any time be subjected to discharge but may be designed to furnish the required stability and durability under substantially shelf or storage status.

A second result of the use of the arrangement shown, not present in current balancing systems, is that, since the operating range of the magnetic amplifier 30 is under all normal circumstances restricted to that portion of the curve of FIG. 2 which approximates to the vertical, at all times in which the regulating system is operating within its designated current and voltage rating the current in the winding 33 will remain at a substantially constant value of a low order of magnitude which in practical examples has been a very few milliamperes. As shown in FIG. 1 it is possible to include a milliammeter in the sensing circuit. In installations in which special requirements exist with regard to precision the indications of this instrument may be of value. Any tendency to subject the apparatus to abnormal operating conditions is clearly indicated. For example, should the apparatus be subjected to an increase in the A.-C. supply voltage beyond its designated regulating capacity this becomes immediately apparent by a tendency of a milliammeter to deviate from its normal indication in the sense of the negative portion of the input scale of FIG. 2. That is to say the reading will increase. On the other hand, should the equipment be subjected to a current overload beyond its control range the meter reading will tend to decrease, reaching zero if the output voltage becomes reduced to the value at which the current in the sensing circuit would become reversed but for the presence of the diode 52.

I have found it advantageous, especially in the absence of any filtering arrangements for supplying the output circuit 2 from the power rectifier 3 to include in the sensing circuit, as shown at 54, a suitable inductance or choke coil.

The advantages of the above described method become more apparent when rectifier regulating problems are encountered which call for a controlling effect which is more complicated than the relatively simple regulation of the output voltage alone as shown in FIG. 1.

Two of the principal applications of regulating systems of the type under consideration are apparatus for charging station batteries, and still larger equipment used in electro-chemical processes such as anodizing. In such installations it is a customary requirement, arising out of the major changes which take place in the characteristics of the load during the process, that during one portion of the process the current be regulated, and that during the remaining time the voltage, regardless of the current flowing, be maintained at a constant value.

For example in anodizing it is found that at the commencement of the process the resistance of the work in the bath may be relatively low such that the current at first drawn by the load circuit may be of undesirable magnitude in relation to the capacity of the installation. Under these circumstances it is specified that the operation be carried on by regulation of the value of the current. However, as the electro-chemical action proceeds the voltage continues steadily to increase, under the constant current condition, until it reaches a magnitude which it is desired be not exceeded, though the process is not, as yet, complete. When this stage in the process is arrived at it is required that thereafter voltage regulation shall automatically be substituted for current regulation until the operation reaches its conclusion.

Figure 3:
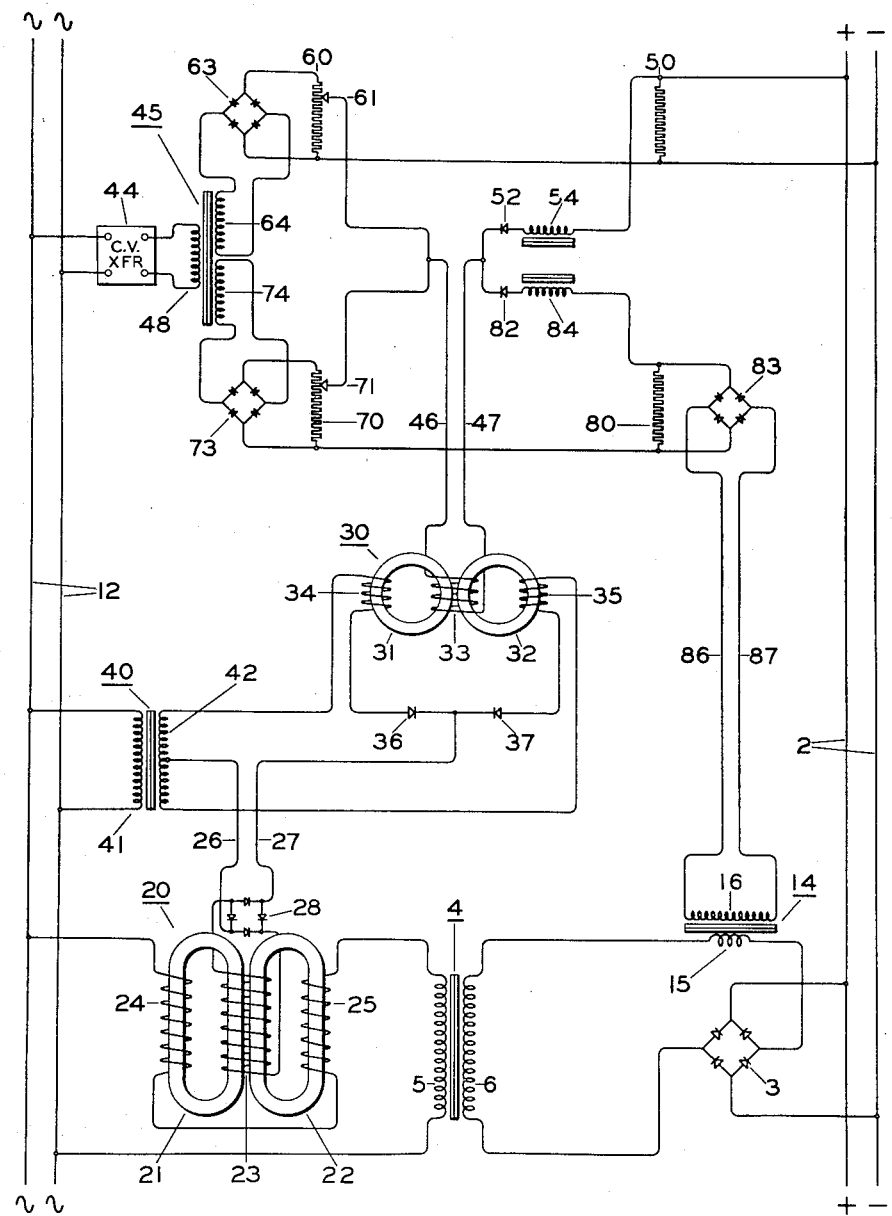
FIG. 3 is a schematic diagram illustrating an embodiment of my invention for regulating both the output voltage and current of a rectifier.

I show, in FIG. 3 a diagram of an arrangement based upon FIG. 1 for performing, entirely automatically, and without any contact making devices or moving parts, a smooth transition from the first mode of regulation into the second.

I show in FIG. 3 all of the components of the first stage magnetic amplifier 30, the second stage or saturable reactor 20, together with the power rectifier 3, the transformer 4, and the transformer 40, all identified in FIG. 1. In addition I show a current transformer 14 having a primary winding 15, connected in series with the circuit through which the power rectifier 3 receives A.-C. energy from the transformer secondary winding 6.

I show also in FIG. 3 the resistor 50, the diode 52 and the inductance 54 also as in FIG. 1. The resistor 50, as previously, is energized from the D.-C. output circuit 2 and may constitute the sample voltage which is compared with the reference voltage in order to furnish the sensing current to the magnetic amplifier. The resistor 50 is repeated in FIG. 3 because the applicant believes it may assist in the explanation of the action of the sensing or balance circuit by visualizing the sample or output voltage at that location in the diagram. It is pointed out, however, that the resistor may be omitted if the transformer 4 be furnished with the desired characteristics as to magnetizing current discussed above in respect of the inductance 8, which latter is not shown in FIG. 3 the desired effect being assumed to be embodied in the transformer 4.

In FIG. 3, in place of the device 43 I employ, as the source of the reference voltage, a resistor 60, provided with an adjustable tap connection at 61, and energized with D.-C. from a rectifier 63, which latter is supplied with alternating current from any suitable regulated constant voltage A.-C. source, shown in the figure at 44.

The constant voltage source 44 may be a ferro-resonant system such as the constant voltage transformer referred to in U.S. Patent 2,143,745 and other similar disclosures. Such devices have the advantage that they are readily available, are inexpensive, and are obtainable in a number of ample power capacities for furnishing substantial differential control excitation to the magnetic amplifying system. They are capable of regulating within close limits and are entirely suitable for use in any regulating apparatus to be operated from regular power supply systems where no appreciable variation in frequency need be contemplated.

As shown in FIG. 3, the C.-V. transformer is connected to be energized by the A.-C. source 12 and supplies regulated constant voltage to a transformer 45 which latter has a primary winding 48 and two separate secondaries 64 and 74 from the former of which the rectifier 63 is energized with a constant A.-C. voltage. There accordingly appears across the resistor 60 a rectified D.-C. voltage likewise of constant value, and which constitutes the D.-C. reference voltage corresponding to 43 in FIG. 1. It is in FIG. 3 more convenient to furnish the adjustment facility at 61. Otherwise the voltage control action takes place, in FIG. 3 in exactly the same manner as has been described and explained with reference to FIG. 1.

I show also in FIG. 3 a second resistor 70, likewise provided with an adjustable connection as shown at 71, and energized with rectified D.-C. energy from a rectifier 73 supplied from the second secondary winding 74 of the transformer 45. There therefore appears across the resistor 70 a second D.-C. voltage of regulated constant magnitude similar to that existing across 60. Thus the resistor 70 provides a second or duplicate D.-C. reference voltage, which, though it need not necessarily be precisely equal to the first one, which is provided by 60, may desirably be of the same order of magnitude. It is to be noted that the separate secondaries 64 and 74 provide requisite electrical isolation between the rectifying systems supplying 60 and 70 respectively.

Referring again to FIG. 3 it will be seen that I provide a fourth resistor 80 energized with direct current from a rectifier 83 which latter is supplied through the two conductors shown at 86 and 87 from the secondary winding 16 of the current transformer 14. The ratio between the primary winding 15 and the secondary winding 16, and the value of the resistance of 80, are respectively selected such that, at the maximum load current delivered by the power rectifier 3, which it is desired to control, the voltage appearing across 80 is of an order of magnitude compatible with the voltage existing across the resistor 70.

As shown in the diagram the negative extremities of resistor 70 and resistor 80 are conjoined so that there is set up between the positive connections to these two resistors, a difference voltage in accordance with the voltage drops existing across the resistors 70 and 80. There is thus set up a second balance system closely analogous that comprised by the resistors 50 and 60. However, it will be noted that due to the presence of transformers 14 and 45 these two balance systems are electrically isolated from each other. This permits the two systems to be commingled in such a manner as to provide a joint controlling action by both of the two sensing systems, one for voltage control and the second for current control, which may be applied to the magnetic amplifier 30. Accordingly as seen in FIG. 3, the connections from both the adjustable contacts 61 and 71 are joined together at the conductor 46. The positive extremity of the resistor 80 is connected, through a second diode 82, similar to 52, and a second inductance 84 corresponding to 54, to the conductor 47.

As a result of these connections the magnetic amplifier 30, through its input winding 33, is subjected to controlling excitation derived from both the voltage regulating system as hereinbefore described, and the above mentioned current regulating system consisting of the circuitry associated with the current transformer 14 and the second reference voltage which is derived through secondary winding 74 from the constant voltage source 44.

Attention may be drawn to the fact that this joint regulating action is to be distinguished from the result which would accrue from the familiar method of applying a plurality of input signals to a magnetic amplifier by means of a number of separate control windings thereon. This is the arrangement which is customary in the magnetic amplifier art when it is desired to provide a response which is proportional to the algebraic sum of a plurality of controlling effects. In the arrangement shown in FIG. 3, on the other hand, the control current applied to the winding 33 is neither the sum of, nor the difference between, the two sensing currents or error signals emanating from the voltage control system and the current control system, respectively. Due to the presence of the diodes 52 and 82 interaction between the two systems is precluded. That is to say, if the voltage control system associated with 50 and 60 sets up a difference voltage which exceeds that set up by the current control system of 70 and 80, the former cannot cause flow of current in a relatively negative sense in the latter circuit. The converse is likewise true. On referring again to the curve of FIG. 2, and considering this in relation to the connections of FIG. 3, with special note of the diodes 52 and 82, it will become apparent that, of the two control systems, that is to say, voltage regulation or current regulation, that one which is preponderant assumes control, and that one which is subordinate is quiescent.

The manner in which the above described circuitry functions may more readily be followed if consideration be given to the action which takes place under practical operating conditions, as for example in the anodizing process.

The proper settings having been determined at which the current regulation and the voltage regulation are to be effected, the appropriate adjustments are made by means of 71 and 61 respectively. The equipment being energized D.-C. voltages will immediately be present across 60 and 70 and lower, increasing, voltages across 50 and 80. At the outset the tendency will be for the voltage across 60 to preponderate over that across 50 and likewise that across 70 to exceed that across 80.

It will be noted on referring to FIG. 3 that the control winding 33 of the magnetic amplifier 30 is included in, and common to, two closed-loop sensing circuits, the upper one, which comprises 60 (in part), 46, 33, 47, 52, 54, and 50; and the lower one, which consists of 70 (in part), 46, 33, 47, 82, 84, and 80. It is seen that on first placing the apparatus in service the sense of the resultant difference voltage around both of these closed loops is clockwise; and that likewise in both loops the direction of conductivity of the two diodes 52 and 82 is such as to preclude current flow in this direction. Accordingly at the outset there will be no flow of current in the input winding 33, and pursuant to the control characteristic curve of FIG. 2, current will be delivered to the control winding 23 of the second stage.

Accordingly the current delivered by the rectifier 3 to the output circuit 2 will tend to increase until either the voltage or the current approaches the control setting previously determined by the positions of 61 and 71.

As previously explained, at the commencement of the anodizing process, before the surface of the aluminum has undergone any substantial chemical change, the resistance of the load circuit comprising the work-piece and the bath, will be relatively low such that only a moderate voltage may suffice to produce a substantial current. Accordingly, in my control system, before the voltage across 50 has approached the order of magnitude of 60, the voltage appearing across 80, which is proportional to the load current will reach equality with that portion of 70 which is included in the control loop. Thus while the resultant voltage difference existing in the upper loop is still in a direction in which flow of current is precluded by 52, this is not the case in the lower loop. As soon as the voltage of 80 exceeds that of 70 the diode 82 permits current to flow in the counter-clockwise sense and a control current commences to flow in the winding 33 of the magnetic amplifier 30.

On referring to FIG. 2 it will be apparent that this will have the effect of preventing further increase in the load current which will be regulated thereafter at the point determined by 71.

It will further be noted that under these conditions the voltage will remain at a value less than the voltage setting as determined by 61. The voltage regulating system under these circumstances is inactive. This status is maintained as long as the voltage of the output circuit remains below that of the voltage regulating setting.

However, as the coating of oxide is built up on the aluminum surface of the work, the resistance steadily increases and there will ultimately be reached a value of resistance at which the voltage necessary to produce the regulated current value will be that which the system is adjusted to provide constant voltage regulation. At this point the load voltage will reach equality with the voltage across that portion of 60 which is included in the circuit, and any further increase in the load voltage beyond this point will give rise to a resultant difference voltage in the upper loop tending to cause flow of current in the counter-clockwise direction. Flow of current in this sense is not blocked by 52 and accordingly at this value of load voltage current is delivered to the input winding 33 by the upper, or voltage regulating, control loop.

As previously explained it is not desired that the voltage be permitted to increase beyond a previously determined value and thus, as the anodizing process continues to its conclusion, with progressively further increasing resistance values, the upper voltage regulating loop assumes control and the voltage is maintained constant at the value determined by 61.

Under these conditions the current steadily diminishes and thus the voltage across 80 has a decreasing value which is less than that across the active portion of 70. During the remaining portion of the anodizing process therefore the current regulating portion of the system, that is to say the lower control loop, remains in a condition of quiescence.

It will thus be seen that the voltage regulating system, at a predetermined point in the process, takes over control from the current regulating system in a smooth and uninterrupted manner.

The type of circuit which I employ in these regulating systems renders it possible for the way in which the transition from one form of control to the other takes place readily to be observable should this be desired for supervision or other purposes. I showed in FIG. 1 a milliammeter connected in the input circuit of the magnetic amplifier 30. In like manner, in FIG. 3, if it be desired, two such instruments may be inserted in the sensing circuit. One of these may be placed in the arm of the circuit which includes 52 and 54; the other should read the current flowing in 82 and 84. When the system is operating under voltage control the former instrument will indicate flow of sensing current whereas the latter will give a zero indication. At the change-over point the instrument in the voltage regulating circuit will cease to show a reading and the meter connected in series with 82 and 84 will commence to read current.

The character of the change-over is related to the quantitative design of the inductances 54 and 84. According to the values assigned to these choke coils the transition may take place at a closely defined point, or there may be an overlapping effect resulting in a penumbral zone in which both milliammeters may indicate some flow of current simultaneously, which effect of course arises from the presumed presence of ripple in the load and other rectified currents.

In applications of regulated rectifiers other than the foregoing example it is a frequent requirement that the maximum output current be limited to a prescribed magnitude exceeding by a desired margin, the full load rating of the equipment. It is well known in the art that saturable reactors per se have certain inherent current limiting characteristics. However, this current limit value must substantially exceed any current value at which accurate voltage control is desired to be maintained. It will be apparent that the arrangement disclosed in FIG. 3 lends itself readily to a current limiting action of great precision and one which may exceed by only a very small percentage a full load value at which completely effective voltage control may be fully functional. All that would be required is a setting for the current control system at the specified current value and the maximum current would be limited to the said magnitude.

However, the provision of a current limiting action only, as distinguished from requirements for regulating at a constant value of current within accurate limits may be secured with some simplification of the arrangements shown in FIG. 3. For example, it is not necessary that there be included, for purposes of limiting or controlling the current, a reference voltage derived from an accurately regulated constant voltage transformer. I show in FIG. 4 an arrangement closely approximate to FIG. 3 but differing in respect to the following features.

Figure 4:
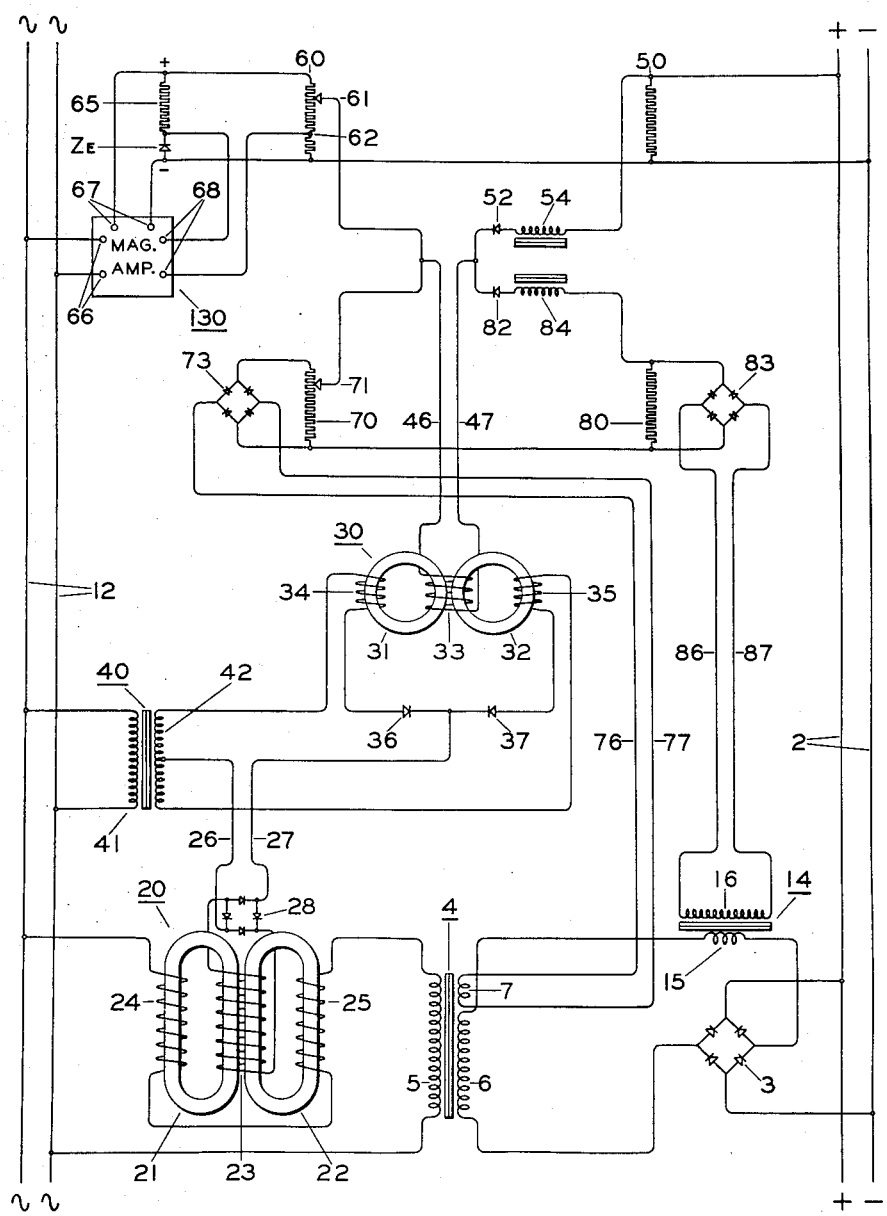
FIG. 4 is a schematic diagram illustrating an embodiment of my invention for regulating the output voltage of a rectifier and for accurately limiting the maximum current deliverable thereby.

In FIG. 4 I show the rectifier 73, instead of being energized with A.-C. from the secondary winding 74, supplied through two conductors 76 and 77 from an additional secondary winding 7 on the power transformer 4. This produces an exceptionally effective current limiting action very positive in its incidence because the reference voltage, in accordance with which the current is controlled when the limiting circuitry is in effect, is not maintained at a constant value, as in the arrangement of FIG. 3, but is actually decreased when the current limiting action commences to take effect. This is because, in accordance with the explanation applying to FIG. 3, immediately that the current control supervenes over the voltage regulation the voltage is automatically reduced. This is accomplished through the instrumentality of the saturable reactor 20 and the reduction in voltage which ensues applies equally to the additional secondary winding 7 as to the output power secondary winding 6. Thus the voltage across the resistor 70 may now be described as a collapsing reference when the current limiting action takes effect. This current limiting instrumentality is, of course, completely quiescent under all conditions in which the magnitude of the output current of the power rectifier does not reach the value at which the limiting device is set to be operative.

With the current limiting arrangement disclosed in FIG. 4 I may employ substantially similar arrangements relative to the voltage regulating system as are shown in FIG. 3, except that may be omitted the second secondary winding 74 of the transformer 45. However, I show in FIG. 4 an arrangement which may be used interchangeably in place of the constant voltage transformer 44 in applications where such may be deemed desirable.

As stated previously certain types of constant voltage transformers are entirely satisfactory for the purposes shown when the equipment is intended for operation from regular power supply systems maintaining an accurate frequency rate. For certain types of mobile or air-borne apparatus where accurate frequency regulation is not always convenient or possible other instrumentalities are preferable. Thus I show in FIG. 4 an example of such an alternative arrangement.

In lieu of the constant voltage transformer 44 and transformer 45 of FIG. 3, I show, in FIG. 4, an additional magnetic amplifier 130, having a pair of terminals at 66 by means of which it is supplied with A.-C. energy from the source 12. The magnetic amplifier 130 may be of the same general character as that identified by the reference numeral 30 in FIG. 3, or of any other suitable or preferred type. It has a pair of output terminals at 67, analogous to the conductors 26, 27 of FIG. 3, and a pair of control or input terminals at 68, which correspond to the conductors 46, 47 of FIG. 3. Accordingly, the pair of output terminals 67 furnish rectified output as do the conductors 26, 27 of FIG. 3; the rectifier 63 of FIG. 3 is not therefore required in the arrangement of FIG. 4.

In FIG. 4 the resistor 60 is supplied with D.-C. from the terminals at 67 and is in addition provided with a tap-point or connection at 62. The output of the magnetic amplifier 130 is connected to supply, in parallel with the resistor 60 another resistor 65 together with a Zener diode identified by the initials Ze to distinguish it from other diodes shown in the diagrams in which conductivity in the forward direction is functional. Accordingly, the two sections of 60, the resistor 65 and the Zener diode comprise a network or bridge system, supplied with D.-C. from the output of the magnetic amplifier 130 through the pair of output terminals at 67. Sensing or output connections from the bridge are taken, respectively, from the junction of the Zener diode and the resistor 65, and from the tap point 62, are applied to the input of the magnetic amplifier 130 at the pair of input terminals 68. It will be understood by those skilled in the art that such an arrangement, due to the characteristics of the Zener diode, may be designed to maintain, accurately, a constant D.-C. voltage applied to the network including the resistor 60, and that this type of voltage reference is independent of frequency.

The magnetic amplifier 130 may be designed to furnish ample output power, comparable with that obtainable from a constant voltage transformer arrangement such as that shown in FIG. 3, so as to secure good dynamic characteristics in the operation of the regulating system. It will be noted that the regulating action of the Zener network is only functional in respect of line voltage variations. Regulating action of the system as a whole arising from load changes do not involve action of the magnetic amplifier 130.

Although I have chosen a particular embodiment of my invention for the purpose of explanation, many modifications thereof will be apparent to those skilled in the art to which it pertains. My invention, therefore, is not to be limited except in so far as is necessitated by the prior art and the spirit of the appended claims.

What I claim as new and desire to secure by Letters Patent of the United States is:

1. In apparatus for supplying direct current and voltage to a load circuit, regulating means comprising a magnetic amplifier having a single control winding, reactor means controlled by said amplifier for varying the direct current supplied to the load circuit, first error-signal supply means for providing a first control voltage that increases with increases in the voltage across the load circuit, second error-signal supply means for providing a second control voltage that increases with increases in the current supplied to the load circuit, first and second diodes each connected directly to said winding, means connecting said first error-signal supply means to said first diode and said control winding in series, and means connecting said second error-signal supply means to said second diode and said control winding in series, said first and second diodes being poled to conduct current in the same direction through said control winding, whereby current flows through said control winding responsive only to the larger one of the first and second control voltages.

2. Regulating means as in claim 1, wherein said first error-signal supply means comprises a first adjustable reference voltage source connected directly to the control winding, a first inductor connected directly to the first diode, and means for supplying between said first reference voltage source and said first inductor a voltage proportional to the voltage across the load circuit and in bucking relation to said first source, and wherein said second error-signal supply means comprises a second adjustable reference voltage source connected directly to the control winding, a second inductor connected directly to the second diode, and means for supplying between said second reference voltage source and said second inductor a voltage proportional to the current supplied to the load circuit and in bucking relation to said second source.

3. Regulating means as in claim 2, wherein the magnetic amplifier is a self-biased type delivering substantially full output at zero current in said control winding, and wherein said first and second diodes are poled to resist the flow of current in the direction that would drain power from said first and second reference voltage sources.

References Cited in the file of this patent

UNITED STATES PATENTS

| | | |
|---|---|---|
| 2,673,324 | Burton et al. | Mar. 23, 1954 |
| 2,774,930 | Bixby | Dec. 18, 1956 |
| 2,814,773 | Comins et al. | Nov. 26, 1957 |

FOREIGN PATENTS

| | | |
|---|---|---|
| 803,240 | Great Britain | Oct. 22, 1958 |